(12) United States Patent
Ochoa et al.

(10) Patent No.: US 11,686,168 B2
(45) Date of Patent: Jun. 27, 2023

(54) APPARATUS AND METHODS FOR DETERMINING IN REAL-TIME EFFICIENCY OF EXTRACTING GAS FROM DRILLING FLUID AT SURFACE

(71) Applicants: Brian B. Ochoa, Hannover (DE); Nicklas Jeremias Ritzmann, Celle (DE)

(72) Inventors: Brian B. Ochoa, Hannover (DE); Nicklas Jeremias Ritzmann, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 315 days.

(21) Appl. No.: 16/998,847

(22) Filed: Aug. 20, 2020

(65) Prior Publication Data

US 2020/0378201 A1 Dec. 3, 2020

Related U.S. Application Data

(63) Continuation-in-part of application No. 14/939,107, filed on Nov. 12, 2015, now Pat. No. 10,781,649.

(51) Int. Cl.
  *E21B 21/06* (2006.01)
  *B01D 19/00* (2006.01)
  (Continued)

(52) U.S. Cl.
  CPC ........ *E21B 21/067* (2013.01); *B01D 19/0042* (2013.01); *B01D 19/0052* (2013.01);
  (Continued)

(58) Field of Classification Search
  CPC .............. E21B 21/067; B01D 19/0042; B01D 19/0052
  See application file for complete search history.

(56) References Cited

U.S. PATENT DOCUMENTS

| 4,635,735 A | 1/1987 | Crownover |
| 4,887,464 A | 12/1989 | Tannenbaum et al. |

(Continued)

FOREIGN PATENT DOCUMENTS

| WO | 2014037731 A1 | 3/2014 |
| WO | 2015006552 A1 | 1/2015 |
| WO | 2015076839 A1 | 5/2015 |

OTHER PUBLICATIONS

Kristian Ferdagsvik;—2014; Master's Thesis, "Use of ultrasonic and acoustic sensors for characterization of liquid-particle flow andevaluation of hole cleaning efficiency", 2014, 101 pages; available online at http://brage.bibsys.no/xmlui/bitstream/handle/11250/220747/Fredagsvik_Kristian.pdf?sequence=1.

(Continued)

*Primary Examiner* — Paul M. West
(74) *Attorney, Agent, or Firm* — Cantor Colburn LLP

(57) ABSTRACT

A system and method for determining an efficiency of gas extraction. A chamber allows inflow and outflow of the drilling fluid. An amount of gas extracted from a drilling fluid flowing through the chamber at a constant rate during a dynamic process is measured. A dissolution curve is obtained indicative of a gas remaining in the chamber after the dynamic process. An amount drawn from the chamber during a static process subsequent to the dynamic process is measured. An amount of gas from the drilling fluid during the static process is determined from a difference between the amount of gas drawn from the chamber during the static process and an amount of gas indicated by the dissolution curve. The gas extraction efficiency is determined from a ratio of the amount of gas extracted during the static process and the amount of gas extracted during the dynamic process.

20 Claims, 6 Drawing Sheets

(51) Int. Cl.
*E21B 49/08* (2006.01)
*G01N 30/32* (2006.01)
*G01N 30/86* (2006.01)
*G01N 30/02* (2006.01)

(52) U.S. Cl.
CPC ...... *B01D 19/0063* (2013.01); *E21B 49/0875* (2020.05); *G01N 30/32* (2013.01); *G01N 30/8675* (2013.01); *G01N 2030/025* (2013.01); *G01N 2030/324* (2013.01)

(56) References Cited

U.S. PATENT DOCUMENTS

| | | | |
|---|---|---|---|
| 4,904,603 A | 2/1990 | Jones et al. | |
| 6,176,323 B1 | 1/2001 | Weirich et al. | |
| 6,389,878 B1 | 5/2002 | Zamfes | |
| 6,637,524 B2 | 10/2003 | Kruspe et al. | |
| 6,974,705 B1 | 12/2005 | Brumboiu et al. | |
| 7,243,035 B2 | 7/2007 | Tison et al. | |
| 7,392,138 B2 | 6/2008 | Frechin et al. | |
| 7,657,392 B2 | 2/2010 | Gysling | |
| 7,844,400 B1 | 11/2010 | Selman et al. | |
| 8,130,591 B2 | 3/2012 | Geerits | |
| 8,583,377 B2 | 11/2013 | Moake | |
| 8,636,060 B2 | 1/2014 | Hernandez | |
| 8,775,089 B2 | 7/2014 | Van Zuilekom et al. | |
| 8,818,779 B2 | 8/2014 | Sadlier et al. | |
| 8,838,390 B1 | 9/2014 | Selman et al. | |
| 8,884,215 B2 | 11/2014 | Gunn et al. | |
| 8,965,703 B2 | 2/2015 | Prakash et al. | |
| 2004/0265176 A1 | 12/2004 | Kerherve et al. | |
| 2010/0089120 A1 | 4/2010 | Hanson | |
| 2011/0174541 A1 | 7/2011 | Strachan et al. | |
| 2013/0263647 A1 | 10/2013 | Barrett et al. | |
| 2013/0311096 A1 | 11/2013 | Greer et al. | |
| 2014/0067307 A1 | 3/2014 | Guerriero et al. | |
| 2014/0190747 A1 | 7/2014 | Hay | |
| 2014/0291023 A1 | 10/2014 | Edbury et al. | |
| 2014/0336936 A1 | 11/2014 | Inanc | |
| 2015/0114714 A1 | 4/2015 | Dahl et al. | |
| 2015/0170087 A1 | 6/2015 | Johnston et al. | |
| 2018/0361273 A1 | 12/2018 | Henderson et al. | |

OTHER PUBLICATIONS

PCT International Search Report and Written Opinion; International Application No. PCT/US2016/060801; International Filing Date: Nov. 7, 2016; dated Feb. 9, 2017; pp. 1-16.

Normal Operation

By-pass Inflow and
Empty Gas Trap

Empty Gas Trap
Agitation ON

Fill up
Gas Trap

APPARATUS AND METHODS FOR DETERMINING IN REAL-TIME EFFICIENCY OF EXTRACTING GAS FROM DRILLING FLUID AT SURFACE

CROSS REFERENCE TO RELATED APPLICATIONS

This application claims the benefit of an earlier filing date from U.S. Non-Provisional application Ser. No. 14/939,107 filed Nov. 12, 2015, the entire disclosure of which is incorporated herein by reference.

BACKGROUND

Field of the Disclosure

This disclosure relates generally to extraction of hydrocarbons and other elements from drilling fluid supplied into a wellbore and drilling fluid returning to surface or recirculating from the wellbore during drilling of the wellbore.

Background of the Art

Wellbores (also referred to herein as "wells" or "boreholes") are drilled in subsurface formations for the production of hydrocarbons (oil and gas) trapped in zones at different depths. Such wells are drilled using a drill string that includes a drilling assembly (commonly referred to as the "bottomhole assembly" or "BHA") at the bottom end of a drill pipe. A drill bit is attached at the bottom of the drilling assembly. To drill a well, the drill string is conveyed into the well. The drill bit is rotated by rotating the drill string from the surface and/or by a mud motor placed in the drilling assembly to disintegrate rock in the subsurface formation. A drilling fluid (commonly referred to as "mud") is supplied under pressure from the surface into the drill string, which fluid discharges at the bottom of the drill bit and returns to the surface via the spacing between the drill string and the well (referred to as the "annulus"). The returning fluid (also referred to herein as the "return fluid") contains the rock pieces disintegrated by the drill bit, commonly referred to as the "cuttings". When drilling through a formation zone containing gas (for example, C1-C9, IC4, IC5, methylcyclohexane, benzene, toluene, CO2, Ar, etc.), condensate and oil, such elements are released from the penetrated zone into the wellbore being drilled. These released elements are then transported to the surface in the drilling fluid returning to the surface. Additional gas may be released into the mud from the oil or condensate due to changing PVT (pressure, volume, temperature) conditions from subsurface to surface. The amount of released gas, not bound or trapped in or on the cuttings, depends on the porosity, permeability and hydrocarbon saturation of the formation.

As the drilling fluid returns to the surface, cuttings are removed from the return fluid. The gases in the returning fluid are extracted to determine the amount of such gases present in the returning fluid. Determining continuously the amount of gases and other elements present in continuously flowing return fluid during drilling is often termed as "mud logging". Typically, to determine such amounts, the drilling fluid is passed through a gas trap. A carrier gas, such as fresh air, is supplied to the fluid in the gas trap and the fluid is continuously agitated with a mechanical agitator. This process separates the gas entrapped in the drilling fluid flowing through the gas trap. The separated gas, mixed with the carrier gas introduced to the gas trap is pulled out from the gas trap by a pneumatic unit and is then supplied to a gas measurement device or unit, such as a mass spectrometer and/or a gas chromatograph, which determines the amount (quantity) of gas present per unit volume in the drilling fluid received from the wellbore during drilling of the wellbore. Of particular relevance during drilling are the hydrocarbons and their amount released from the formation into the returning drilling fluid. This gas extraction information, when correlated to the depth of drilling, is used by operators for a variety of purposes, including, controlling drilling parameters. Depending on the drilling fluid type (water-based, oil-based, synthetic material-based), the amount of hydrocarbons in the drilling fluid returning to the surface may vary and different hydrocarbon components may have a different solubility in the drilling fluid used. Such gas extraction measurements can also be used to determine features, such as gas/oil contact and oil/water contact. Therefore, there is a need in the oil industry to have reliable measurements of hydrocarbon components in the drilling fluid returning from the wellbore. There is also a need to identify not just the relative ratios of different hydrocarbons (for example, C1 to C9) but also the total amount of gas in the drilling mud. In order to accomplish this, it is necessary to determine the gas extraction efficiency of the gas trap for each of these hydrocarbons. This gas extraction efficiency needs to be determined periodically during drilling of the wellbore for accurate determination of the hydrocarbon contents in the returning fluid.

The disclosure herein provides a system and methods for determining gas present in a continuously flowing drilling fluid received from a wellbore and the gas extraction efficiency of such system.

SUMMARY

In one aspect, a method of determining an efficiency of extracting gas from a drilling fluid is disclosed. The method includes: An amount of gas extracted from a drilling fluid flowing through a chamber at a constant rate during a dynamic process is measured at a gas measurement device. A dissolution curve indicative of a gas remaining in the chamber after the dynamic process is obtained. An amount of gas drawn from the chamber during a static process subsequent to the dynamic process in which a set volume of the drilling fluid is in the chamber is measured at the gas measurement device. An amount of gas extracted from the drilling fluid during the static process is determined from a difference between the amount of gas drawn from the chamber during the static process and an amount of gas indicated by the dissolution curve. The gas extraction efficiency is determined from a ratio of the amount of gas extracted from the drilling fluid during the static process and the amount of gas extracted from the drilling fluid during the dynamic process.

In another aspect, a system for determining an efficiency of gas extraction from a drilling fluid is disclosed. The system includes a chamber for inflow and outflow of the drilling fluid; a gas measurement device; and a processor. The processor is configured to: measure an amount of gas extracted from a drilling fluid flowing through a chamber at a constant rate during a dynamic process; obtain a dissolution curve indicative of a gas remaining in the chamber after the dynamic process; measure an amount of gas drawn from the chamber during a static process subsequent to the dynamic process in which a set volume of the drilling fluid is in the chamber; determine an amount of gas extracted from the drilling fluid during the static process from a difference between the amount of gas drawn from the chamber during the static process and an amount of gas indicated by the dissolution curve; and determine the gas extraction efficiency from a ratio of the amount of gas extracted from the drilling fluid during the static process and the amount of gas extracted from the drilling fluid during the dynamic process.

In yet another aspect, a method of determining an efficiency of extracting gas from a drilling fluid is disclosed. The method includes: measuring, at a gas measurement device, an amount of gas extracted from a drilling fluid flowing through a chamber at a constant rate during a dynamic process; evacuating from the chamber gas remaining in the chamber after the dynamic process; measuring, at the gas measurement device, an amount of gas drawn from a set volume of the drilling fluid in the chamber during a static process subsequent to the dynamic process; and determining, at a processor, the gas extraction efficiency from a ratio of the amount of gas extracted from the set volume of the drilling fluid during the static process and the amount of gas extracted from the drilling fluid during the dynamic process.

Examples of the more important features of a system and methods have been summarized rather broadly in order that the detailed description thereof that follows may be better understood, and in order that the contributions to the art may be appreciated. There are, of course, additional features that will be described hereinafter and which will form the subject of the claims.

BRIEF DESCRIPTION OF THE DRAWING

For a detailed understanding of the apparatus and methods disclosed herein, reference should be made to the accompanying drawing and the detailed description thereof, wherein like elements are generally given same numerals and wherein.

DETAILED DESCRIPTION

Figure 1:
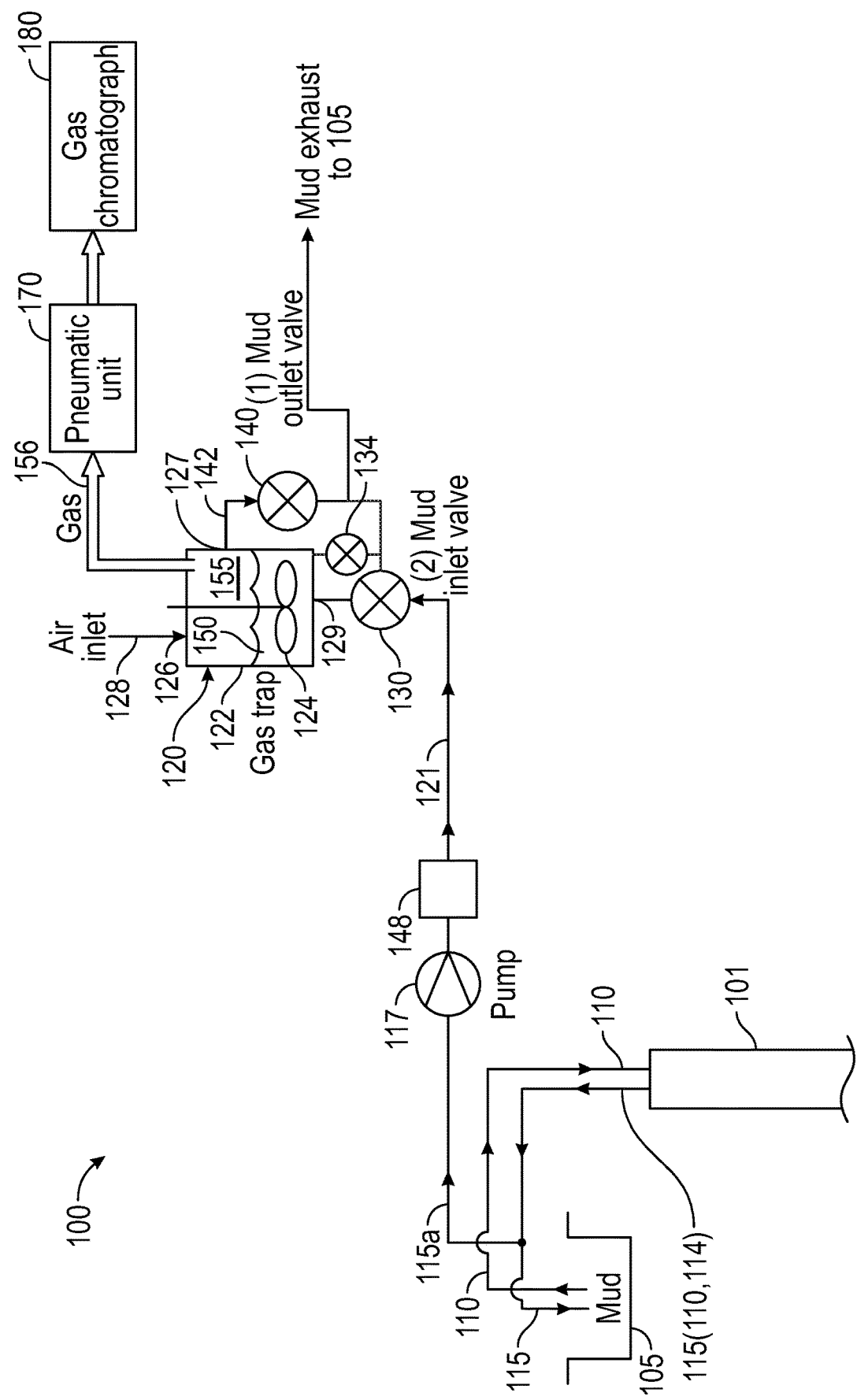
FIG. 1 shows a line diagram of a non-limiting surface logging system according to one embodiment of the present disclosure for determining gas extracted from a continuously flowing drilling fluid during drilling of a wellbore and the gas extraction efficiency of such system.

In general, the disclosure provides a system and methods for; (1) calculating or determining the amount various gases (selected gases) and other elements in a continuously flowing sample extracted from drilling fluid supplied to a wellbore and/or the drilling fluid returning from the wellbore and (2) determining the efficiency of such extraction process. FIG. 1 is a schematic diagram of a gas system 100 that extracts gases (including, but not limited to, C1-C9, CO2, Ar) and other elements from a continuously flowing drilling fluid supplied into the wellbore from the surface and the drilling fluid returning from the wellbore and determines therefrom the amount of gas present in a such fluid and the efficiency of such an extraction process in real time. As is well known in the oil industry, wellbores are drilled by conveying a drill string (not shown) in a wellbore, such as wellbore 101, which drill string includes a drill pipe, a drilling assembly containing a variety of sensors attached to the bottom of the drill pipe and a drill bit attached at the bottom of the drilling assembly. A drilling fluid 110 from a pit 105 is supplied under pressure into the drill string from the surface while the drill bit is rotated to cut the formation rock. The drilling fluid 110 discharges at the bottom of the drill bit. The fluid 110 returns to the surface via annuls between the drill string and the wellbore carrying therewith the formation rock pieces 114 (referred to as "cuttings") cut by the drill bit. The returning fluid 115 includes the drilling fluid 110 and the cuttings 114.

Still referring to FIG. 1, a pump 117 extracts sampling fluid 115a from the returning fluid 115 and pumps the sampling fluid 115a via line 121 into a gas trap unit or device 120 (also referred to herein as "gas trap"). A flow control device 130, such as a remotely-controlled valve, is provided to control the amount of sampling fluid 115a pumped into the gas trap unit 120. In various embodiments, the flow control device 130 is a three-way valve that allows either passing the sampling fluid 115a to the gas trap unit 120 or bypassing the gas trap unit by flowing the sampling fluid 115a directly to a mud exhaust 105. The gas trap unit 120 includes a chamber 122 having a fluid inlet 129 and a fluid outlet 127, a fluid agitator 124 inside the chamber 122, which may be a mechanical agitator, and a carrier gas inlet 126 for introducing or supplying the carrier gas 128 into the chamber 122. An outflow line 142 connected to the outlet 127 and having a flow control device 140, such as a remotely-controlled valve, is provided to discharge liquid 150 from the gas trap unit 120 to the mud pit 105. A heater 148 may be provided in flow line 121 to heat the sampling fluid 115a to a preselected temperature before supplying such fluid to the gas trap unit 120. Any gas in the chamber 122 head may be extracted by a vacuum unit, such as pneumatic device 170, and supplied to a gas measuring unit or device 180 for determining the amount of extracted gas. The pneumatic device 170 operates by pulling the carrier gas into the gas trap 120. The pneumatic devices 170 sucks the gas and carrier gas mixture from the gas trap 120. When the rate of gas extraction from the sampling fluid 115a is less than the flow rate of the vacuum pump, the carrier gas is pulled into the gas trap and mixed with the extracted gas.

The gas system 100 is suitable for both extracting gases from the sampling fluid 115a supplied to the wellbore and the drilling fluid returning from the wellbore 101, measuring the amount of gas extracted and for determining the efficiency of the extraction process during drilling of the wellbore. The efficiency of the gas extracted from the sampling fluid 115a during drilling of the wellbore 101 may be defined as the amount of the gas extracted from a continuously flowing sampling fluid 115a divided by the total amount of the gas present in a fixed or constant volume of the drilling fluid. Although FIG. 1 shows that sampling fluid 115a is drawn from the returning fluid 115, the apparatus and methods provided herein are equally applicable to the fluid 110 supplied into the wellbore. For drilling fluid supplied to the wellbore, sampling fluid 115a is drawn from fluid 110 instead from the returning fluid 115. A method of extracting gases from the sampling fluid 115a and determining the efficiency of such extraction process is described below. In such a method, the amount of gases extracted is calculated or determined from continuously flowing sampling fluid 115a using the gas trap unit 120, while the total amount of such gases present in the sampling fluid 115a is calculated or determined from a constant volume sample of the sampling fluid 115a using the gas trap unit 120. The process of extracting the gas from sampling fluid 115a and determining the amount of a particular (or selected) gas in such fluid may be referred to as the "dynamic process" while the process for determining the total amount of such selected gas present in the sampling fluid 115a from a constant volume may be referred to as a "static process". The static process may be conducted periodically during the drilling of a particular well to ensure that the total amount of gas calculated corresponds to the drilling fluid being supplied to or returned from the wellbore, as the case maybe, for accurate determination of the extraction efficiency throughout the drilling process. Periodic determination of the total amount of gas will account for any changes of the operational parameters as well as changes in gas concentration and mud characteristics over time. The calculated amounts of the extracted gas and the total amount of such gas present in the sampling fluid 115a is correlated to the depth of the wellbore from where such fluid was received. This correlation is based on the flow rate of the drilling fluid. Methods of determining such depths are well known in the art. The amount of gas extracted and the total gas present in the fluid can be used to determine the extent of gas influx into the wellbore from the formation being drilled and the depth of the wellbore at which such influx occurred.

Still referring to FIG. 1, a method of extracting gas from the sampling fluid 115a may include the following steps. Open the valves 130 and 140 and turn on the pump 117 to pass the sampling fluid 115a at a constant flow rate through the gas trap unit 120. Supply the carrier gas and turn on or activate the agitator 124. At this point, the sampling fluid 115a is continuously flowing through the trap chamber 122 as such fluid is entering into the trap chamber through inlet 129 and discharging from the chamber 122 through outlet 127 at the same rate. The agitator aids in removing gas from the sampling fluid 115a flowing through the chamber 122. The pneumatic unit 170 continuously extracts gas leaving the sampling fluid 115a in the chamber 122 head and passes it to the gas measuring unit 180, which provides measurements from which the amount of gas extracted per unit volume of sampling fluid 115a is calculated or determined. Thus, in the dynamic process, the valves 130 and 140 are open, the sampling fluid 115a is continuously passing through the gas trap unit 120 at a constant rate and at a constant temperature, if a heater is provided. The agitator 124 causes the gas trapped in the sampling fluid 115a passing through the gas trap unit 120 to release, which gas is extracted by the pneumatic unit 170 and supplied to the measuring unit 180 for measuring the amount of gas in the drilling fluid during drilling of the wellbore, i.e., in real time.

FIGS. 2A-2E illustrate a method of performing a dynamic gas extraction process followed by a static gas extraction process including transition stages between these two processes. The method includes intermediate stages in which the drilling fluid is drained from the gap trap at the end of the dynamic gas extraction process and then introduce fresh mud to the chamber to begin the static gas extraction process. Gas remaining in the chamber after the dynamic gas extraction process can alter gas measurements during the ensuing static gas extraction process. Therefore, the methods disclosed herein perform calculations to remove the effects of the gas remaining in the chamber from the dynamic gas extraction process on the gas measurements obtained during the static gas extraction process.

Figure 2A:
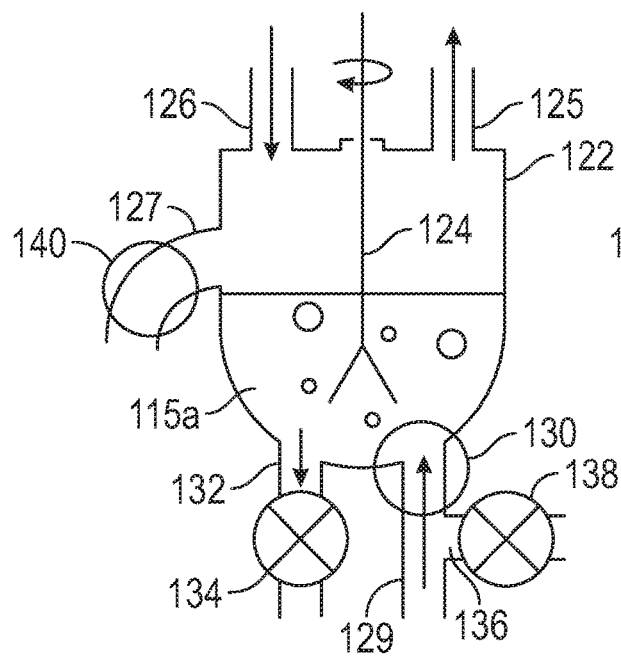
FIGS. 2A-2E illustrate a method of performing a dynamic gas extraction process followed by a static gas extraction process including transition stages between these two processes.

FIG. 2A shows the gas trap 120 being used for the dynamic gas extraction process. Drilling fluid enters the gas trap 120 at fluid inlet 129 and exits the gas trap at fluid outlet 127. Generally, by having the fluid inlet 129 located at the bottom of the chamber 122 and the fluid outlet 127 located at a side of the chamber 122 at a position vertically higher than the fluid inlet 129, the amount of sampling fluid 115a in the chamber 122 can be held constant. The gas trap 120 further includes a drain 132 that is used for emptying the sampling fluid 115a from the chamber 122. The drain 132 include a flow control device 134 or valve. During the dynamic gas extraction process of FIG. 2A, the flow control device 134 of the drain 132 is closed so that the drilling fluid exits the chamber 122 only via the fluid outlet 127.

The fluid inlet 129 includes a flow control device 130 or valve. The fluid inlet 129 includes an escape line 136 that diverts drilling fluid from the fluid inlet 129 when the flow control device 130 is in a closed position as in FIGS. 2B and 2C in order that continuous flow of the sampling fluid 115a from upstream of the gas trap 120 can be maintained when drilling fluid is not being passed through chamber 112. The escape line 136 includes a flow control device 138 or valve that can be in an open or closed position. Although FIGS. 2A-2E show two flow control devices 130 and 138, in alternate embodiments a single flow control device can be used to perform the functions of the two flow control devices 130 and 138 to direct the flow of drilling fluid in the fluid inlet 129 with respect to the chamber 122 and escape line 136. The chamber 122 further includes a fluid agitator 124 that stirs the sampling fluid 115a to aid in extracting gas from the sampling fluid 115a.

During the dynamic gas extraction process of FIG. 2A, fluid flows into the chamber 122 at a constant flow rate at the fluid inlet 129 and consequently exits the chamber at a constant flow rate at the fluid outlet 127. A carrier gas, such as air 128, is passed into the chamber 122 at a carrier gas inlet 126 at a top of the chamber 122 as the fluid is being stirred. The carrier gas evacuates the gas emanating from the top surface of the sampling fluid 115a out of the chamber 122 via ditch line 125 for testing at the gas measurement unit 180. During the dynamic gas extraction process, flow control devices 130 and 140 are in an open position, while flow control devices 134 and 138 are in a closed position.

Figure 2B:
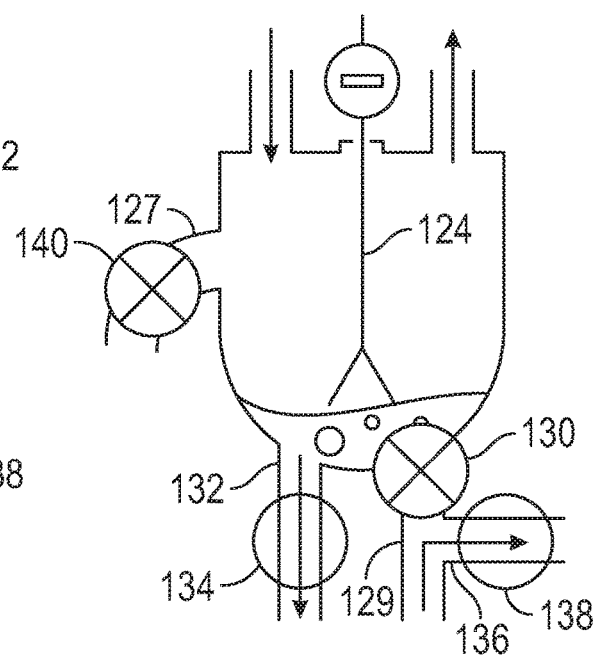

FIG. 2B shows a draining operation at the gas trap after completion of the dynamic gas extraction process. For the operation of FIG. 2B, flow control device 140 at the fluid outlet 127 and flow control device 130 at the fluid inlet 129 are both closed. The flow control device 138 of escape line 136 is in an open position to maintain a continuous flow of the drilling fluid. The flow control device 134 at drain 132 is in an open position to allow the sampling fluid 115a to drain from the chamber 122 until the chamber 122 is empty. While the drilling fluid is draining from the chamber 122, the fluid agitator 124 is turned off. The carrier gas is pumped out of the chamber 122 during this operation to direct the remaining gases from the drilling fluid out of the chamber 122 via ditch line 125 for testing at the gas measurement unit 180.

Figure 2C:
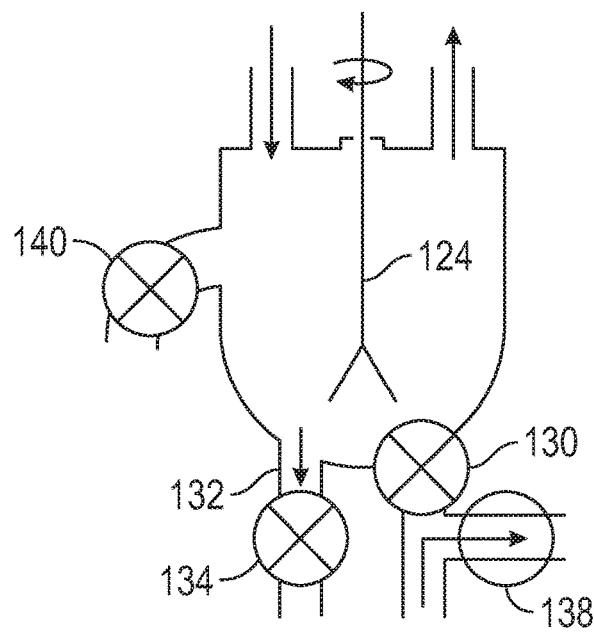

FIG. 2C shows a gas evacuation operation after evacuating the drilling fluid from the chamber 122 during which gas remaining in the chamber is evacuated. In FIG. 2C, the flow control devices 130, 134 and 140 are in the closed position, while the flow control device 138 of the escape line 136 is in the open position. During this operation, the carrier gas is continuously pumped out of the chamber 122 and the fluid agitator 124 is turned on in order to assist in the evacuation of the gases from the chamber 122 and to stabilize the gas dynamics of the system. The evacuated gas is delivered to the gas measurement unit 180.

Figure 2D:
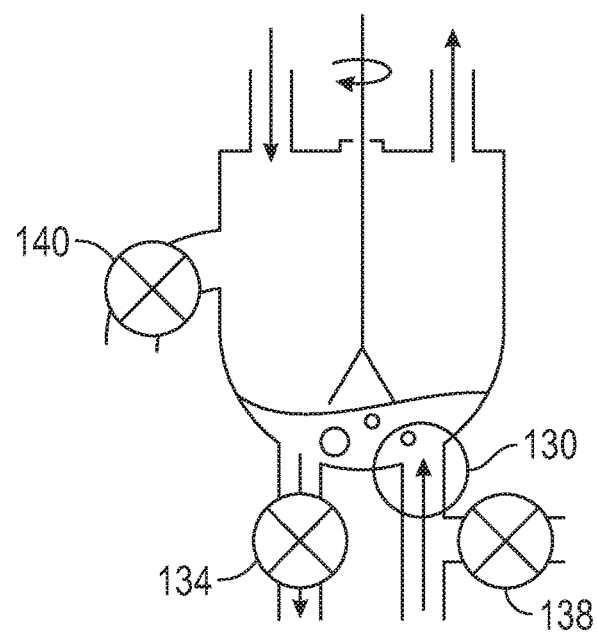

FIG. 2D shows the beginning of the static process of gas extraction in which gas extraction is measured for a predetermined volume of the drilling fluid. For this operation, flow control device 130 is in the open position in order to fill the chamber 112. The flow control devices 134, 138 and 140 are in the closed position. With the fluid agitator 124 in operation, carrier gas is introduced into the chamber 122 as the drilling fluid starts to fill into the chamber 122, with gas from the drilling fluid being evacuated via ditch line 125 from the chamber 122 for testing.

Figure 2E:
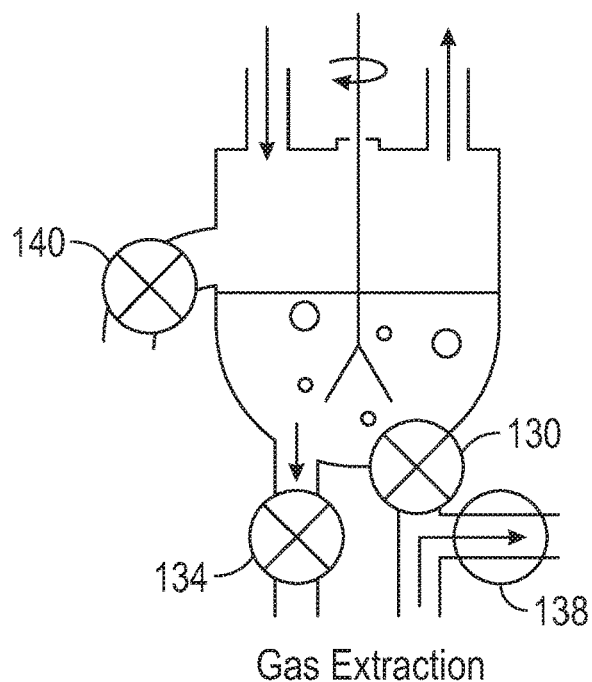

FIG. 2E shows a final stage of the static process of gas extraction. The flow control devices 130, 134 and 140 are in a closed position in order to contain a constant volume of the sampling fluid 115a in the chamber 122, while the flow control device 138 is in an open position. The sampling fluid 115a is maintained in the chamber 122 at a constant volume as gas is extracted therefrom and measurements of the gas are obtained.

Figure 3:
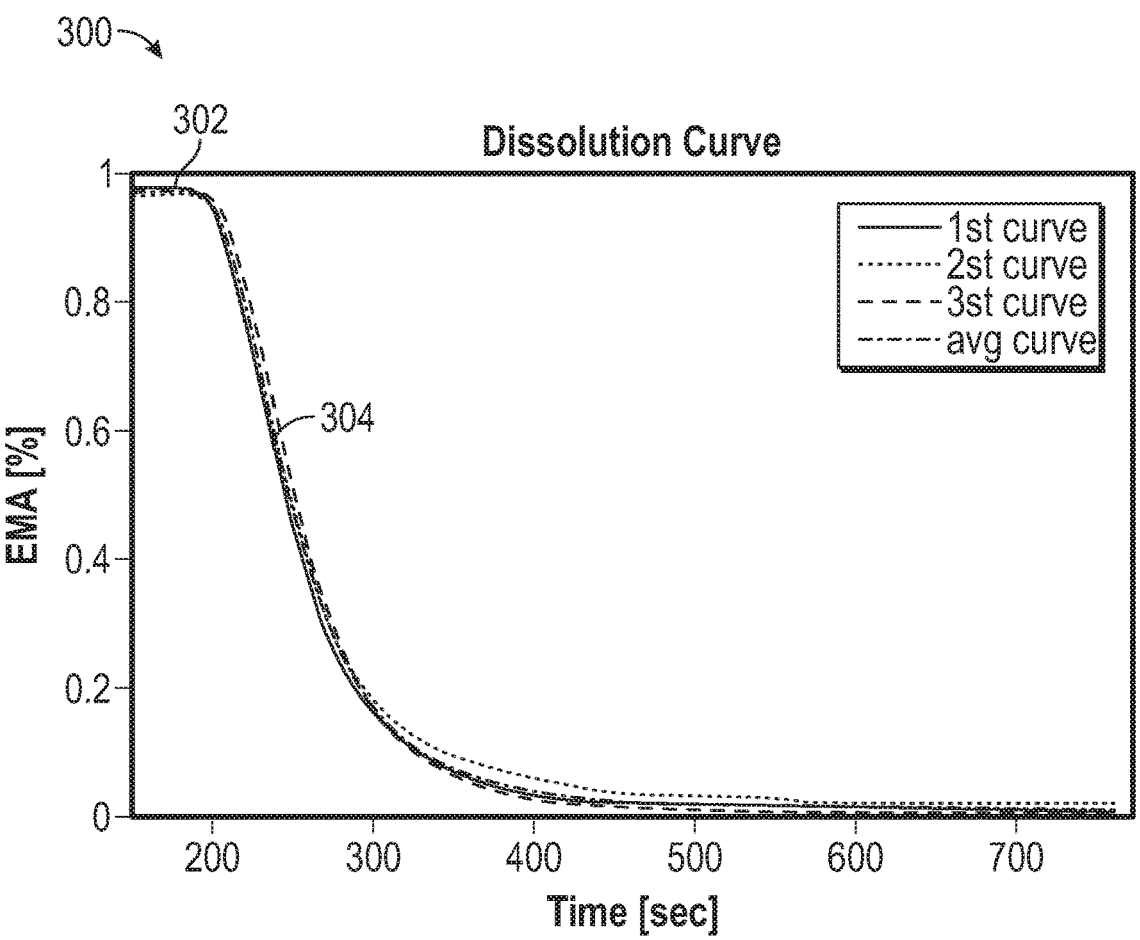
FIG. 3 shows dissolution curves related to the dynamic gas extraction process and the ensuing draining process and gas evacuation process as shown in FIGS. 2A-2C.

FIG. 3 shows dissolution curves related to the dynamic gas extraction process and the ensuing draining process and gas evacuation process as shown in FIGS. 2A-2C. A dissolution curve shows the dissipation of gas over time from the chamber and the gas lines during the draining and gas evacuation processes. FIG. 3 shows three normalized dissolution curves obtained from three separate repetitions of the processes of FIGS. 2A-2C as well as a dissolution curve that is an average of the three normalized dissolution curves. The dissolution curves includes a first portion 302 representing gas measurements obtained during the dynamic gas process extraction process of FIG. 2A. The first portion 302 occurs between a time of about t=0 to about t=200 seconds. The values of the gas measurements during the first portion 302 are substantially constant. At time t=200 seconds, the dynamic gas extraction process of FIG. 2A is ended and the draining process of FIG. 2B is initiated, causing the decay characteristic of the second portion 304 of the dissolution curve. The gas amounts are measured through the draining process of FIG. 2B and while the chamber 122 sits empty, as in FIG. 2C. For illustrative purposes only, the measurements during the second portion 304 are obtained up to about a time t=800 seconds. The processes of FIGS. 2A-2C can be performed without the processes of FIGS. 2D and 2E in order to obtain the dissolution curves. In various embodiments, the dissolution curve is obtained previously. Once the dissolution curve has been obtained, the gas trap can be operated to perform both the dynamic process and constant process as shown in the FIGS. 2A-2E. The previously-obtained dissolution curve is used to correct total gas measurements obtained during the constant gas process extraction process, as discussed below.

Without using the dissolution curve, it is necessary to wait until the gas measurements (e.g., at gas measuring unit 180) to go to zero before beginning to filling the gas trap (FIG. 2D) and extracting (FIG. 2E) the gas of the constant mud volume. Waiting for the gas reading to go to zero can take up to about 700 seconds in various embodiments. By using the dissolution curve, the filling and extraction process of FIGS. 2D and 2E can be started without having to wait for gas measurements to go to zero. Thus, the static test can be performed in a shorter period of time, allowing the system to return to dynamic operation (i.e., normal operation) in a reduced amount of time.

Figure 4:
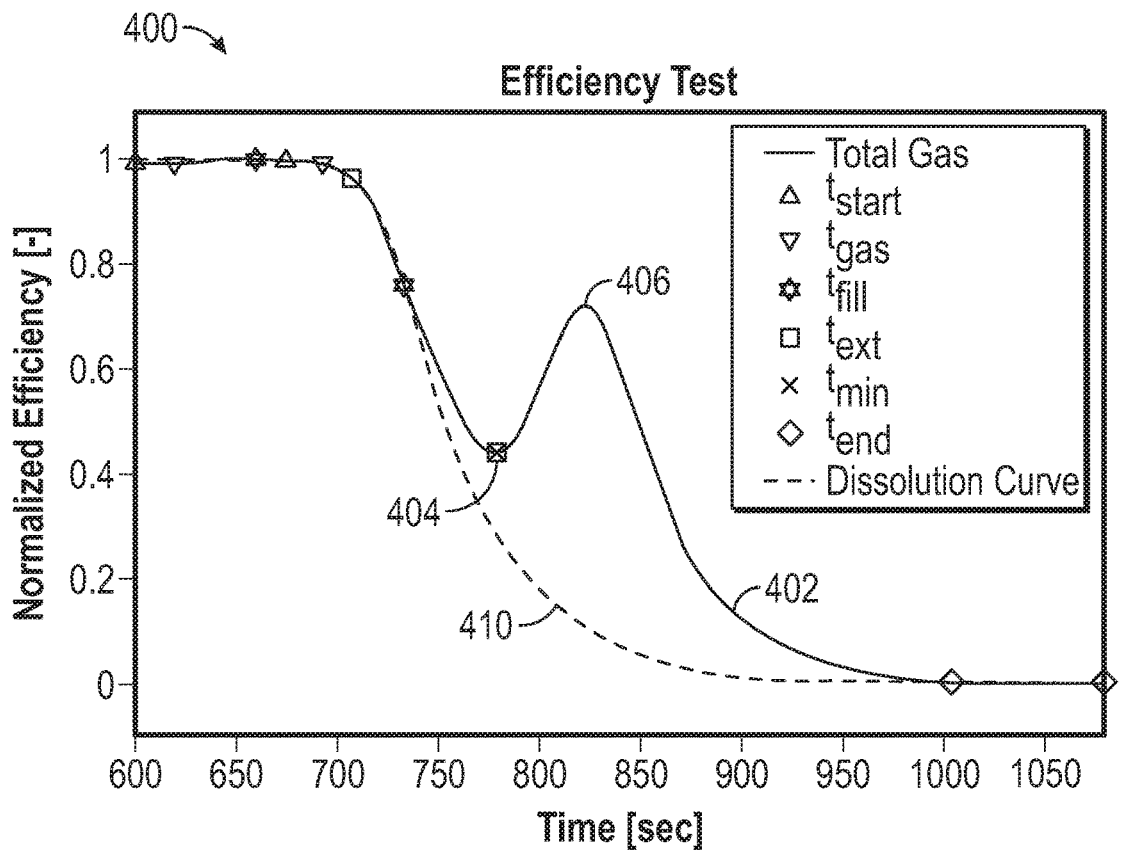
FIG. 4 shows a graph of a total gas measurement curve obtained during the processes of FIGS. 2A-2E as well as a related dissolution curve.

FIG. 4 shows a graph 400 of a total gas measurement curve 402 obtained during the processes of FIGS. 2A-2E as well as a related dissolution curve 410. The total gas measurement curve 402 and the dissolution curve 410 are normalized to each other and the temporal location of the dissolution curve 410 has been shifted in order to align the end of the dynamic gas extraction process of FIG. 2A for the dissolution curve 210 with the corresponding end of the dynamic gas extraction process for the total gas measurement curve 402. The total gas measurements curve 402 and the dissolution curve 410 both display a flat region up to a time of about t=700 seconds and display a decay portion thereafter. The total gas measurement curve 402 continues to decay until it reaches a local minimum value 404. The time at which the dissolution curve 410 deviates from the total gas measurement curve 402 (e.g., about 5=740 seconds) coincides with a time at which mud is reintroduced into the chamber to initiate the static process of gas extraction, i.e., the beginning of the process shown in FIG. 2D. As the drilling fluid is introduced into the chamber, the total gas measurement curve 402 increases to a local maximum 406. The local maximum 406 varies depending on the amount of gas in the sampling fluid 115a. After the local maximum 406, the total gas measurement curve 402 decreases as eventually the remaining gas in the drilling fluid in the chamber is depleted and/or removed from the drilling fluid.

Figure 5:
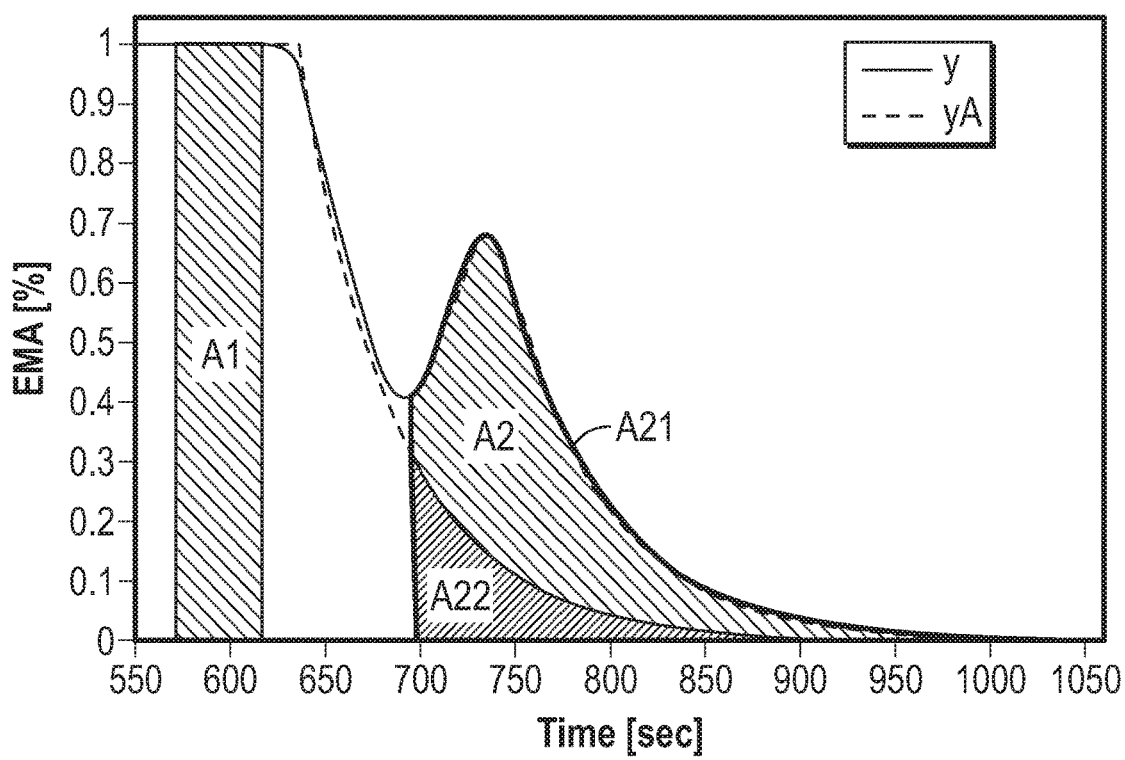
FIG. 5 shows areas related to the total gas measurement curve and the dissolution curve suitable for determining a gas extraction efficiency.

FIG. 5 shows areas related to the total gas measurement curve 402 and the dissolution curve 410 suitable for determining a gas extraction efficiency. Area A1 represents an amount of gas extracted during continuous flow of the drilling fluid through the chamber over a selected amount of time, i.e., the dynamic gas extraction process. Area A21 represents the total gas measurement obtained during the static gas extraction process and is measured from the minimum of the total gas measurement curve, i.e., from the time at which the drilling fluid is introduced into the chamber for the contact gas extraction process (shown in FIGS. 2D-2E). The amount of time used to define area A1 during the dynamic gas extraction process is the same duration as the amount of time used to fill the gas trap during the static test, in order to compare the volumes of gas in a fixed volume of mud for each process. This time equivalence is based on the mud pump operating at the same rate during either process. The area A21 is due to a combination of gas extracted from the drilling fluid in the chamber (area A2) and gas remaining in the chamber and gas lines (A22) after the dynamic gas extraction process. Thus, Area A21 is the sum of area A2 and area A22. The area A21 can be determined by integrating under curve 402 starting at the time of the local minimum value 404. Area A22 can be determined by integrating under the dissolution curve 410 starting at the time of the local minimum value 404. Area A2 can be determined by subtracting area A22 from area A21, i.e., A2=A21-A22. Once the areas A1 and A2 have been determined, the gas extraction efficiency (TO) can be determined from $\eta = A1/A2$.

In addition to determining total gas extraction efficiency $\eta$, the total gas measurement curve 410 can be used to determine extraction efficiency for each of the hydrocarbon compounds present in the gas. The total gas measurement is a summation of each of the hydrocarbon compounds present in the extracted gas. Thus, knowledge of the composition of the total gas allows for determining gas extraction efficiency for the constituent hydrocarbon compounds.

In general, the gas measurement system obtains total gas measurement values at a high frequency while obtaining measurements of hydrocarbon compounds within the gas at a lower frequency. In various embodiments, the gas measurement system measures total gas measurement values at a frequency of about 24 Hertz (Hz), while the gas chromatographer 180 measures an amount of each of the hydrocarbon compounds (e.g., C1 to C5) about every 45 seconds. Because the hydrocarbon compounds (e.g., C1 to C5) are measured every 45 seconds, it is useful to generate a continuous curve of a selected hydrocarbon compound that can be used to calculate areas similar to those of FIG. 5 for each of the selected hydrocarbon compound. This continuous curve can be generated using a suitable fitting algorithm based on the shape of the total gas measurement curve.

Figure 6:
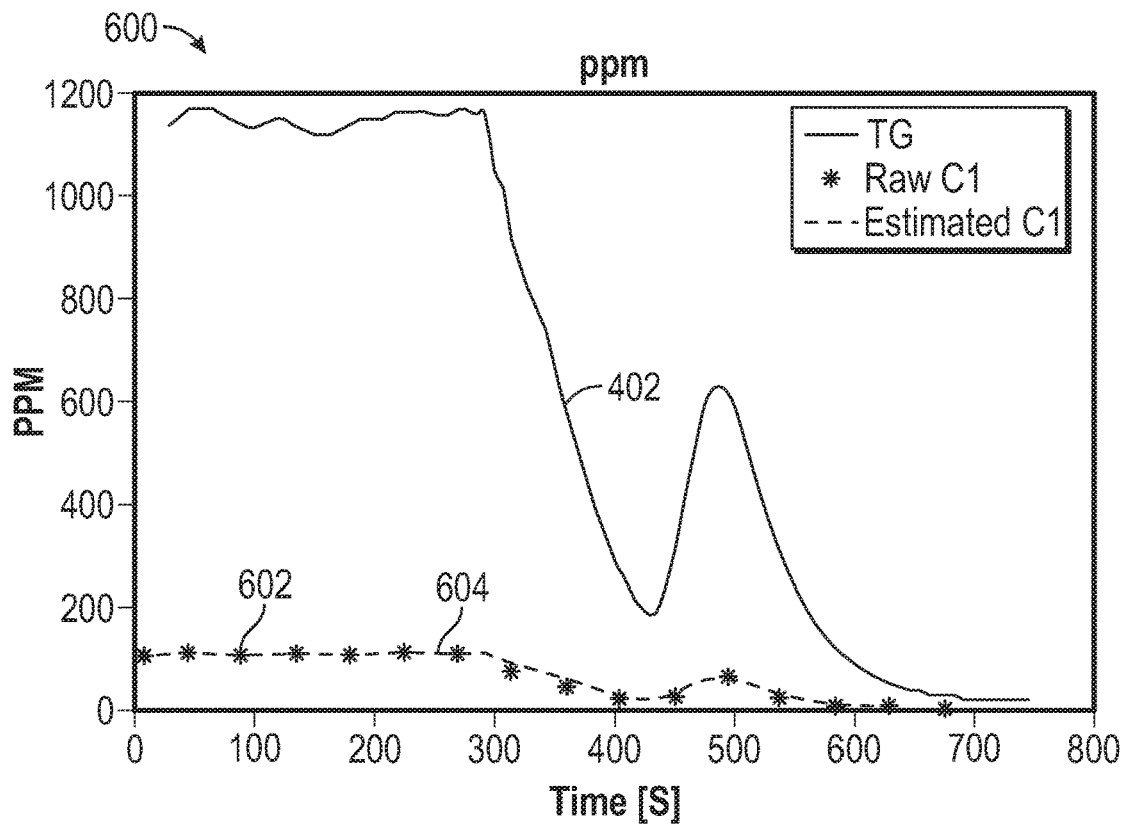
FIG. 6 shows concentrations of an individual hydrocarbon compound and a total gas.
Figure 7:
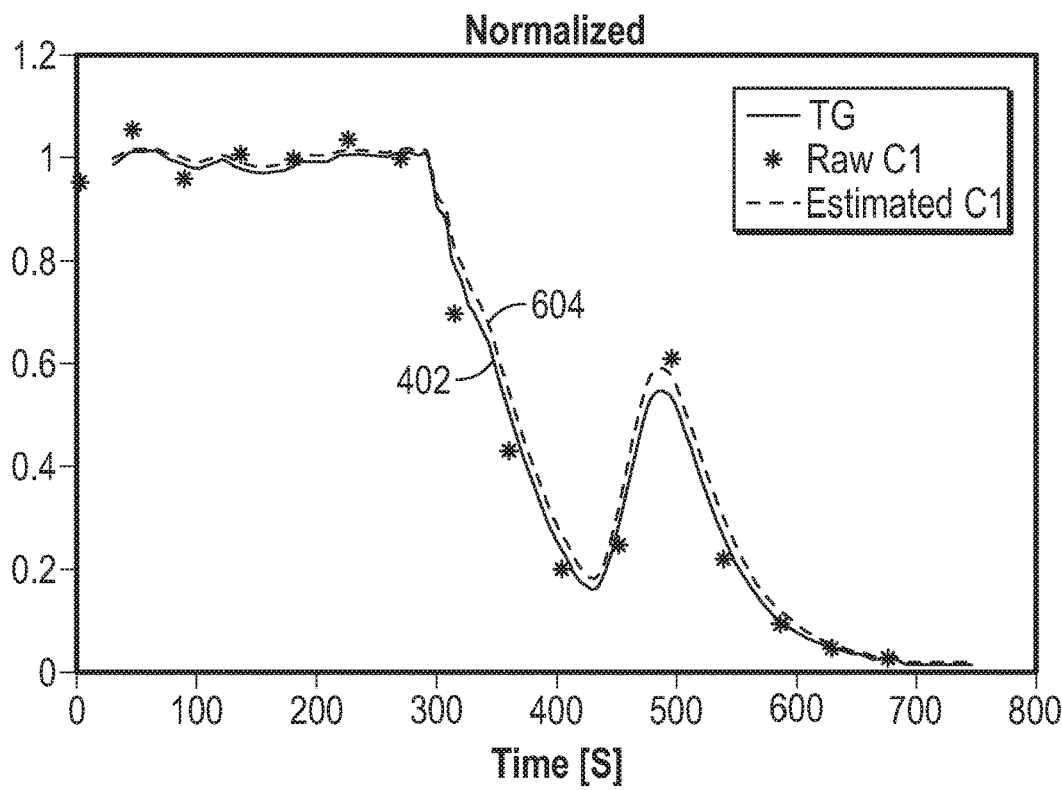
FIG. 7 shows a hydrocarbon curve obtained from normalization of a fitted curve of FIG. 6.

FIG. 6 shows concentrations of an individual hydrocarbon compound and a total gas. Measurements of the hydrocarbon compound C 1 is shown in graph 600 along with a total gas measurement curve 402. The total gas measurement curve 402 is fit to the individual C1 measurements 602 in order to obtain a fitted curve 604. Fitted curve 604 thus represents a gas measurement for the C1 hydrocarbon. The fitted curve 604 is normalized in order to be used for gas efficiency calculations for the C1 hydrocarbon. FIG. 7 shows the C1 hydrocarbon curve 704 obtained from normalization of the fitted curve 604. The C1 hydrocarbon curve 704 can be used alongside a normalized dissolution curve (not shown) using the methods discussed above with respect to FIG. 5 in order to determine a gas extraction efficiency for the C1 hydrocarbon. This process can be repeated for each of the hydrocarbons in the gas in order to determine individual gas extraction efficiencies for each hydrocarbon. Based on the measured hydrocarbon composition and the fluid type used for the drilling operation, features like a gas/oil contact and/or an oil/water contact can be determined. These features can be used to improve characterization of downhole formations, downhole fluids, etc., thereby affecting at least a drilling or production operation.

Figure 8:
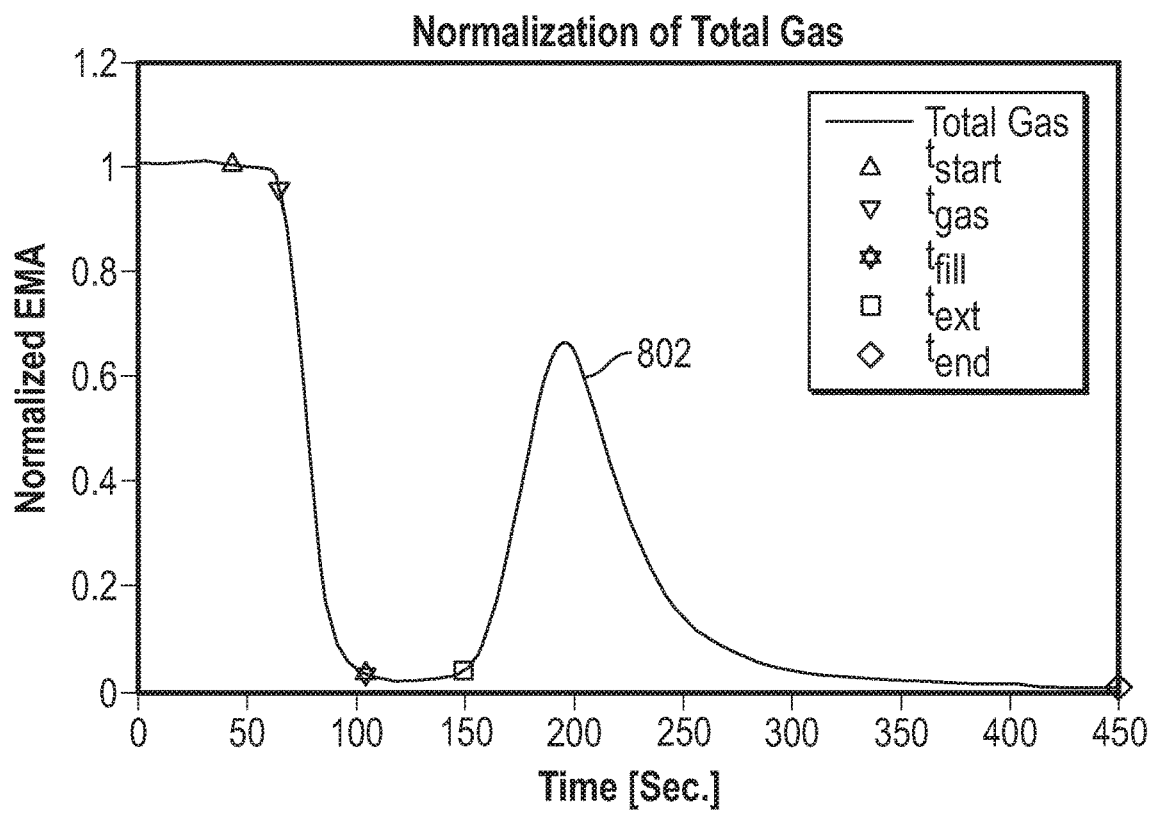
FIG. 8 illustrates a total gas measurement curve obtained for an alternate method of determining a gas extraction efficiency.

FIG. 8 illustrates a total gas measurement curve 802 obtained for an alternate method of determining a gas extraction efficiency. In the alternate method, during the process of FIG. 2B, the pneumatic unit 170 blows pressurized clean air into the ditch line 125 and chamber 122 to flush out the gas remaining in the chamber 122 and in the ditch line 125. The remaining steps of FIGS. 2A, 2C, 2D and 2E remain unchanged. As a result, there is little or no remnant gas from the dynamic gas measurement process to interfere with the static gas measurement process.

Figure 9:
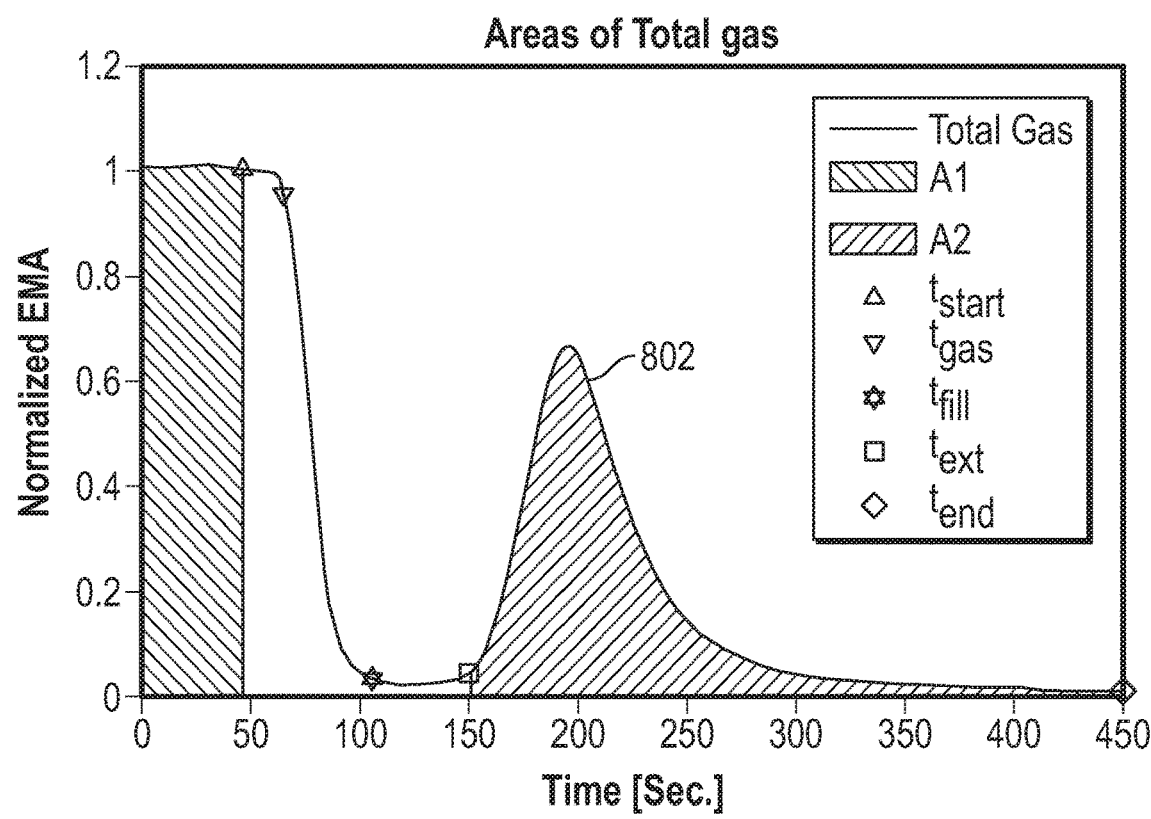
FIG. 9 shows areas used for calculating gas extraction efficiency using the total gas measurement curve of FIG. 8.

FIG. 9 shows areas used for calculating gas extraction efficiency using the total gas measurement curve 802 of FIG. 8. The area A1 (dynamic process) and A2 (static process) are independent of each other and relatively easy to calculate. Once the areas A1 and A2 are determined the total gas extraction efficiency gas be calculated by $\eta=A1/A2$.

Embodiment 1

A method of determining an efficiency of extracting gas from a drilling fluid. The method includes: measuring, at a gas measurement device, an amount of gas extracted from a drilling fluid flowing through a chamber at a constant rate during a dynamic process; obtaining, at a processor, a dissolution curve indicative of a gas remaining in the chamber after the dynamic process; measuring, at the gas measurement device, an amount of gas drawn from the chamber during a static process subsequent to the dynamic process in which a set volume of the drilling fluid is in the chamber; and determining, at the processor, an amount of gas extracted from the drilling fluid during the static process from a difference between the amount of gas drawn from the chamber during the static process and an amount of gas indicated by the dissolution curve; and determining, at the processor, the gas extraction efficiency from a ratio of the amount of gas extracted from the drilling fluid during the static process and the amount of gas extracted from the drilling fluid during the dynamic process.

Embodiment 2

The method of any prior embodiment, wherein the dissolution curve is indicative of gas remaining in the chamber and gas lines as drilling fluid is drained from the chamber after the dynamic process.

Embodiment 3

The method of any prior embodiment, wherein the set volume of the drilling fluid during the static process is a different volume of fluid as the drilling fluid flowing through the chamber during the dynamic process and the gas drawn from the chamber during the static process is a different volume of gas as the gas drawn from the chamber during the dynamic process.

Embodiment 4

The method of any prior embodiment, further comprising obtaining the dissolution curve prior to performing the dynamic process and the static process.

Embodiment 5

The method of any prior embodiment, further comprising determining an area under a total gas measurement curve obtained during the static process starting from a time at which drilling fluid is introduced into the chamber.

Embodiment 6

The method of any prior embodiment, further comprising determining gas extraction efficiency for a hydrocarbon compound in the gas.

Embodiment 7

The method of any prior embodiment, further comprising normalizing a gas measurement curve for the hydrocarbon compound to the dissolution curve.

Embodiment 8

The method of any prior embodiment, further comprising flushing gas from the chamber between the dynamic process and the static process.

Embodiment 9

A system for determining an efficiency of gas extraction from a drilling fluid. The system includes a chamber for inflow and outflow of the drilling fluid, a gas measurement device, and a processor. The processor is configured to:

measure an amount of gas extracted from a drilling fluid flowing through a chamber at a constant rate during a dynamic process, obtain a dissolution curve indicative of a gas remaining in the chamber after the dynamic process, measure an amount of gas drawn from the chamber during a static process subsequent to the dynamic process in which a set volume of the drilling fluid is in the chamber, determine an amount of gas extracted from the drilling fluid during the static process from a difference between the amount of gas drawn from the chamber during the static process and an amount of gas indicated by the dissolution curve, and determine the gas extraction efficiency from a ratio of the amount of gas extracted from the drilling fluid during the static process and the amount of gas extracted from the drilling fluid during the dynamic process.

Embodiment 10

The system of any prior embodiment, wherein the dissolution curve is indicative of gas remaining in the chamber as drilling fluid is drained from the chamber after the dynamic process.

Embodiment 11

The system of any prior embodiment, wherein the processor is further configured to obtain the dissolution curve prior to performing the dynamic process and the static process.

Embodiment 12

The system of any prior embodiment, wherein the processor is further configured to determine an area under a total gas measurement curve obtained during the static process starting from a time at which drilling fluid is introduced into the chamber.

Embodiment 13

The system of any prior embodiment, wherein the processor is further configured to determine gas extraction efficiency for a hydrocarbon compound in the gas.

Embodiment 14

The system of any prior embodiment, wherein the processor is further configured normalize a gas measurement curve for the hydrocarbon compound to the dissolution curve.

Embodiment 15

The system of any prior embodiment, wherein the processor is further configured flush gas from the chamber between the dynamic process and the static process.

Embodiment 16

A method of determining an efficiency of extracting gas from a drilling fluid. The method includes: measuring, at a gas measurement device, an amount of gas extracted from a drilling fluid flowing through a chamber at a constant rate during a dynamic process; evacuating from the chamber gas remaining in the chamber after the dynamic process; measuring, at the gas measurement device, an amount of gas drawn from a set volume of the drilling fluid in the chamber during a static process subsequent to the dynamic process; and determining, at a processor, the gas extraction efficiency from a ratio of the amount of gas extracted from the set volume of the drilling fluid during the static process and the amount of gas extracted from the drilling fluid during the dynamic process.

Embodiment 17

The method of any prior embodiment, wherein a pneumatic unit draws gas from the chamber during the dynamic process and the static process, further comprising using the pneumatic unit to blow pressurized clean air chamber to flush out the gas remaining in the chamber.

Embodiment 18

The method of any prior embodiment, wherein the chamber includes a ditch line between the chamber and the pneumatic unit, further comprising using the pneumatic unit to flush the gas from the ditch line.

Embodiment 19

The method of any prior embodiment, further comprising determining gas extraction efficiency for a hydrocarbon compound in the gas.

Embodiment 20

The method of any prior embodiment, further comprising normalizing a gas measurement curve for the hydrocarbon compound to the dissolution curve.

The foregoing disclosure is directed to the certain exemplary non-limiting embodiments. Various modifications will be apparent to those skilled in the art. It is intended that all such modifications within the scope of the appended claims be embraced by the foregoing disclosure. The words "comprising" and "comprises" as used in the claims are to be interpreted to mean "including but not limited to". Also, the abstract is not to be used to limit the scope of the claims.

The invention claimed is:

1. A method of determining an efficiency of extracting a gas from a drilling fluid, comprising:
measuring, at a gas measurement device, an amount of the gas extracted from the drilling fluid flowing through a chamber at a constant flow rate during a dynamic process;
obtaining, at a processor, a dissolution curve indicative of an amount of the gas remaining in the chamber after the dynamic process;
measuring, at the gas measurement device, an amount of the gas drawn from the chamber during a static process subsequent to the dynamic process in which a set volume of the drilling fluid is in the chamber; and
determining, at the processor, an amount of the gas extracted from the drilling fluid during the static process from a difference between the amount of the gas drawn from the chamber during the static process and the amount of the gas indicated by the dissolution curve; and
determining, at the processor, the gas extraction efficiency from a ratio of the amount of the gas extracted from the drilling fluid during the static process and the amount of the gas extracted from the drilling fluid during the dynamic process.

2. The method of claim 1, wherein the dissolution curve is indicative of the amount of the gas remaining in the chamber as the drilling fluid is drained from the chamber after the dynamic process.

3. The method of claim 1, wherein the amount of the gas drawn from the chamber during the static process is a different from the amount of the gas extracted from the chamber during the dynamic process.

4. The method of claim 1, further comprising obtaining the dissolution curve prior to performing the dynamic process and the static process.

5. The method of claim 1, further comprising determining an area under a total gas measurement curve obtained during the static process starting from a time at which the drilling fluid is introduced into the chamber.

6. The method of claim 1, further comprising determining a gas extraction efficiency for a hydrocarbon compound in the gas.

7. The method of claim 6, further comprising normalizing a gas measurement curve for the hydrocarbon compound to the dissolution curve.

8. The method of claim 1, further comprising flushing the gas from the chamber in the time between the dynamic process and the static process.

9. A system for determining an efficiency of gas extraction from a drilling fluid, comprising:
- a chamber for inflow and outflow of the drilling fluid;
- a gas measurement device; and
- a processor configured to:
  - measure an amount of a gas extracted from the drilling fluid flowing through a chamber at a constant flow rate during a dynamic process;
  - obtain a dissolution curve indicative of an amount of the gas remaining in the chamber after the dynamic process;
  - measure an amount of the gas drawn from the chamber during a static process subsequent to the dynamic process in which a set volume of the drilling fluid is in the chamber;
  - determine an amount of the gas extracted from the drilling fluid during the static process from a difference between the amount of the gas drawn from the chamber during the static process and the amount of the gas indicated by the dissolution curve; and
  - determine the gas extraction efficiency from a ratio of the amount of the gas extracted from the drilling fluid during the static process and the amount of the gas extracted from the drilling fluid during the dynamic process.

10. The system of claim 9, wherein the processor is further configured to obtain the dissolution curve prior to performing the dynamic process and the static process.

11. The system of claim 9, wherein the processor is further configured to determine an area under a total gas measurement curve obtained during the static process starting from a time at which the drilling fluid is introduced into the chamber.

12. The system of claim 9, wherein the processor is further configured to determine a gas extraction efficiency for a hydrocarbon compound in the gas.

13. The system of claim 12, wherein the processor is further configured to normalize a gas measurement curve for the hydrocarbon compound to the dissolution curve.

14. The system of claim 9, wherein the processor is further configured to flush the gas from the chamber in the time between the dynamic process and the static process.

15. The system of claim 9, wherein the processor is further configured to evacuate the gas remaining in the chamber after the dynamic process by using a pneumatic unit.

16. A method of determining an efficiency of extracting a gas from a drilling fluid, comprising:
- measuring, at a gas measurement device, an amount of the gas extracted from the drilling fluid flowing through a chamber at a constant flow rate during a dynamic process;
- evacuating from the chamber the gas remaining in the chamber after the dynamic process;
- obtaining a dissolution curve indicative of an amount of the gas dissipating from the chamber over time during the evacuation process;
- determining an amount of the gas remaining in the chamber from the dissolution curve;
- measuring, at the gas measurement device, an amount of the gas drawn from a set volume of the drilling fluid in the chamber during a static process subsequent to the dynamic process; and
- determining, at a processor, the gas extraction efficiency from a ratio of the amount of the gas drawn from the set volume of the drilling fluid during the static process and the amount of the gas extracted from the drilling fluid during the dynamic process and the amount of the gas indicated by the dissolution curve.

17. The method of claim 16, wherein a pneumatic unit draws the gas from the chamber during the dynamic process and the static process, further comprising using the pneumatic unit to pass in a carrier gas in the chamber to flush out the gas remaining in the chamber.

18. The method of claim 17, further comprising a ditch line between the chamber and the pneumatic unit, further comprising using the pneumatic unit to flush the gas from the ditch line.

19. The method of claim 16, further comprising determining a gas extraction efficiency for a hydrocarbon compound in the gas.

20. The method of claim 19, further comprising normalizing a gas measurement curve for the hydrocarbon compound to the dissolution curve.

* * * * *